(12) United States Patent
Yanagihara et al.

(10) Patent No.: US 8,945,755 B2
(45) Date of Patent: Feb. 3, 2015

(54) SECONDARY BATTERY AND VEHICLE MOUNTING THE SAME

(75) Inventors: Yasuhiro Yanagihara, Yokohama (JP); Hideaki Horie, Yokosuka (JP); Yoshio Shimoida, Yokohama (JP); Kyouichi Watanabe, Yokosuka (JP); Osamu Shimamura, Yokohama (JP); Yuichiro Yamamura, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1322 days.

(21) Appl. No.: 12/121,923

(22) Filed: May 16, 2008

(65) Prior Publication Data
US 2008/0292952 A1    Nov. 27, 2008

(30) Foreign Application Priority Data
May 22, 2007   (JP) ................................. 2007-135949

(51) Int. Cl.
*H01M 4/46*      (2006.01)
*H01M 10/0585*   (2010.01)
*H01M 2/26*      (2006.01)
*H01M 10/04*     (2006.01)
*H01M 10/0525*   (2010.01)

(52) U.S. Cl.
CPC .......... *H01M 10/0585* (2013.01); *H01M 2/266* (2013.01); *H01M 10/0413* (2013.01); *H01M 10/0463* (2013.01); *H01M 10/0525* (2013.01); *Y02T 10/7011* (2013.01); *Y02E 60/122* (2013.01)
USPC ............................. 429/152; 429/129; 429/209

(58) Field of Classification Search
USPC ....................................................... 429/162
See application file for complete search history.

(56) References Cited

U.S. PATENT DOCUMENTS

| 4,521,498 | A  | * | 6/1985  | Juergens ........................ 429/59  |
| 5,360,684 | A  | * | 11/1994 | Duval et al. .................. 429/162 |
| 5,422,200 | A  |   | 6/1995  | Hope et al.                             |
| 6,022,642 | A  | * | 2/2000  | Tsukamoto et al. .......... 429/312 |
| 6,387,567 | B1 | * | 5/2002  | Noh ............................. 429/211 |
| 6,495,283 | B1 | * | 12/2002 | Yoon et al. .................... 429/162 |
| 6,982,132 | B1 |   | 1/2006  | Goldner et al.                          |
| 2004/0043289 | A1 | * | 3/2004 | Shimamura et al. .......... 429/162 |

(Continued)

FOREIGN PATENT DOCUMENTS

CN    1186357 A    7/1998
JP    05-314969    11/1993

(Continued)

OTHER PUBLICATIONS

EPO Communication dated Jun. 12, 2014 with the extended European search report completed on Jun. 4, 2014, from the corresponding European Patent Application No. 08156558.2.

*Primary Examiner* — Ula C. Ruddock
*Assistant Examiner* — Archer Dudley
(74) *Attorney, Agent, or Firm* — Young Basile

(57) ABSTRACT

The disclosure discusses a secondary battery with superior durability and a vehicle configured to mount the same. The secondary battery comprises an electrode structure wherein a cathode is formed at one side of a base material layer having electrical insulating property and an anode is formed at another side of the base material layer. A plurality of electrode structures are stacked with an electrolyte layer interposed therebetween such that the cathode and anode of adjacent electrode structures are on opposite sides of the electrolyte layer.

15 Claims, 9 Drawing Sheets

(56) References Cited

U.S. PATENT DOCUMENTS

| | | | |
|---|---|---|---|
| 2004/0219428 A1* | 11/2004 | Nagayama | 429/218.1 |
| 2004/0253512 A1* | 12/2004 | Watanabe et al. | 429/210 |
| 2005/0132562 A1* | 6/2005 | Saito et al. | 29/623.5 |

FOREIGN PATENT DOCUMENTS

| | | |
|---|---|---|
| JP | 08-250103 | 9/1996 |
| JP | 09-237639 | 9/1997 |
| JP | 11-102711 | 4/1999 |
| JP | 2000-299130 | 10/2000 |
| JP | 2004-071290 | 3/2004 |
| JP | 2004-079481 | 3/2004 |
| JP | 2005-174586 | 6/2005 |
| JP | 2005-340089 | 12/2005 |
| KR | 10-2005-0096926 A | 10/2005 |

* cited by examiner

FIG. 4A  Bidirectional end support beam (concentrated load)

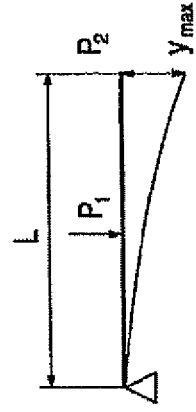

$y_{max} = PL^3/(48EI)$

E: Young's modulus
I: Cross-sectional secondary moment

FIG. 4B  Bidirectional end support beam (uniformly-distributed load)

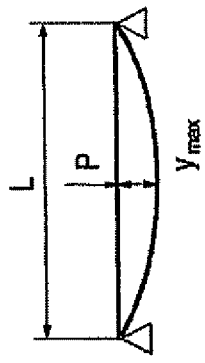

$y_{max} = 5wL^4/(384EI)$

FIG. 4C  Cantilever beam (concentrated load)

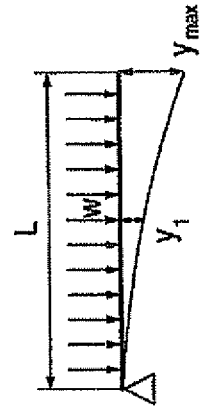

i) when the concentrated load is exerted to the center portion $y_{max} = 5P_1L^3/(48EI)$ ii) when the concentrated load is exerted to the leading end $y_{max} = P_2L^3/(3EI)$ FIG. 4D  Cantilever beam (uniformly-distributed load)

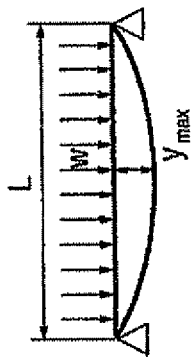

$y_1 = wL^4/(8EI)$

| | Comparison example | Present invention | Effect |
|---|---|---|---|
| (A) | Cantilever support  L=a | Bidirectional end support  L=a | ○ |
| (B) | Cantilever support  L=b | Bidirectional end support  L=b | ◎ |
| (C) | Cantilever support  L=√(a²+b²) | Bidirectional end support  L=a | △ |
| (D) | Cantilever support  L=√(a²+b²) | Bidirectional end support  L=b | △ |

SECONDARY BATTERY AND VEHICLE MOUNTING THE SAME

CROSS-REFERENCE TO RELATED APPLICATION

This application claims priority from Japanese Patent Application Serial No. 2007-135949, filed May 22, 2007, which is incorporated herein in its entirety by reference.

TECHNICAL FIELD

The present invention relates to a secondary battery and a vehicle mounting the same.

BACKGROUND

As a power source of a motor for generating a driving force of Electric Vehicles (EV) or Hybrid Electric Vehicles (HEV), a secondary battery such as a lithium ion battery or a nickel hydrogen battery has been actively pursued and developed.

Japanese Patent Laid-Open Publication No. (HEI) 11-102711 discloses a secondary battery having an electrode structure wherein the same electrodes are formed at both surfaces of a resin film (see FIG. 1).

BRIEF SUMMARY

Embodiments of a secondary battery and a component for such a battery are taught herein. One secondary battery comprises at least two stacked electrode structures, each electrode structure including a cathode formed on one surface of a base material layer having an electrical insulating property and an anode formed on an opposed surface of the base material layer. The secondary battery also includes an electrolyte layer interposed between adjacent electrode structures such that a cathode of one electrode structure is located on a surface of the electrolyte layer and an anode of another electrode structure is located on an opposed surface of the electrolyte layer.

BRIEF DESCRIPTION OF THE DRAWINGS

The description herein makes reference to the accompanying drawings wherein like reference numerals refer to like parts throughout the several views, and wherein:

FIGS. 4A-4D show a reducing effect of a flexible volume of the electrode structure by the secondary battery shown in FIG. 1;

DETAILED DESCRIPTION OF EMBODIMENTS OF THE INVENTION

Certain embodiments of the invention are explained in detail below with reference to the accompanying drawings, where elements are not drawn to scale in order to illustrate details.

The first embodiment is initially explained with reference to FIGS. 1 and 2. A secondary battery 100 of this embodiment comprises an electrode structure wherein a cathode is formed at one side of a base material layer having electrical insulating property and an anode is formed at another side thereof. Then, a plurality of electrode structures with an electrolyte layer interposed therebetween are stacked such that the cathode and anode of the adjacent electrode structures oppose each other. The secondary battery 100 is, for example, a lithium ion secondary battery.

Figure 1:
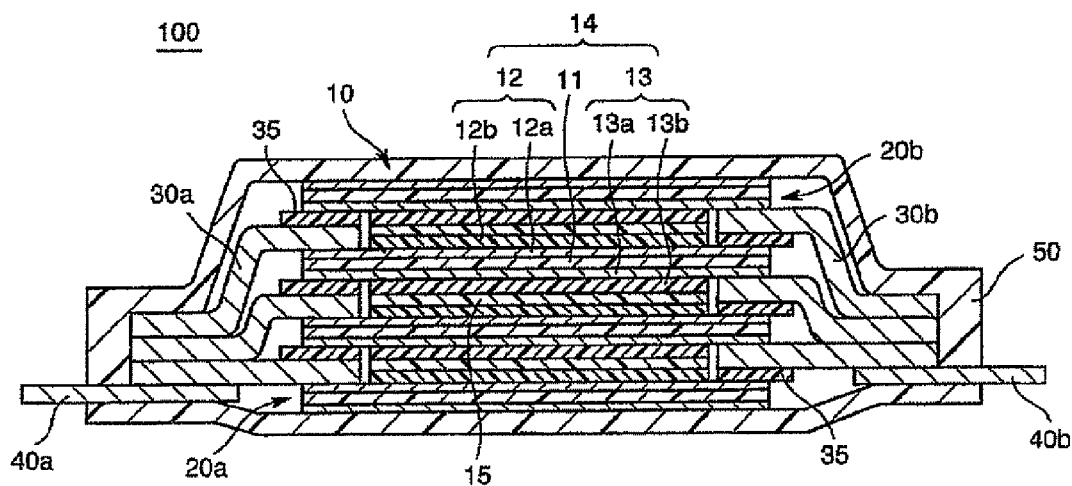
FIG. 1 is a cross-sectional view of a secondary battery constructed in accordance with a first embodiment of the invention.

As shown in FIG. 1, the secondary battery 100 comprises a battery element 10, a collecting tab portion (expansion portion) 20, a bonding tab (collecting member) 30, an electrode tab 40 and an exterior member 50. The battery element 10, the collecting tab portion 20 and the bonding tab 30 are received and sealed within the exterior member 50. The exterior member 50 is, for example, formed so that two sheets of aluminum laminate films are thermally fused to each other to form a housing for the secondary battery 100. The electrode tab 40 include a cathode tab 40a and an anode tab 40b elongated externally of the exterior member 50.

Hereinafter, the battery element 10, the collecting tab portion 20 and the bonding tab 30 of the secondary battery 100 are explained in detail.

The battery element 10 is configured to generate electricity by using a chemical reaction of materials. The battery element 10 is in a flat rectangular shape and comprises an electrode structure 14 wherein a cathode 12 is formed at one side of a base material layer 11 having electrical insulating property, and an anode 13 is formed at another side thereof. The battery element 10 is formed by stacking a plurality of electrode structures 14 with an electrolyte layer 15 interposed therebetween such that the cathode 12 and anode 13 of the adjacent electrode structures 14 are on opposing surfaces of the electrolyte layer. At a lower portion of a lowermost electrode structure 14 among the stacked electrode structures 14, a cathode terminal electrode is stacked via the electrolyte layer 15. This is so that the cathode terminal electrode has only the cathode 12 formed at one side of the base material layer 11. At an upper portion of an uppermost electrode structure 14, an anode terminal electrode is stacked via the electrolyte layer 15 so that the anode terminal electrode has only the anode 13 formed at one side of the base material layer 11. Further, the number of stacking the electrode structures 14 is not limited to the configuration shown in FIG. 1.

The base material layer 11 is formed having at least one insulating layer and is interposed between the cathode 12 and the anode 13. Also, the cathode 12 and the anode 13 are electrically insulated by the base material layer 11. Such a base material layer 11 is, for example, formed of polyimide. Further, in another embodiment, the base material layer 11 may be formed of thermosetting resin such as polyethylene terephthalate (PET), phenol resin and epoxy or extensible resin such as rubber, vinyl chloride resin, polystyrene, ABS resin, polyethylene and polypropylene. Alternatively, the base material layer 11 may be, for example, formed by a multi-layer structure wherein two or more thin films formed of such materials are combined.

The cathode 12 includes a cathode collector layer 12a and a cathode active material layer 12b sequentially stacked at one side of the base material layer 11. The anode 13 includes an anode collector layer 13a and an anode active material layer 13b sequentially stacked at an opposite surface of the base material layer 11. The cathode collector layer 12a is, for example, formed of aluminum and integrally formed with the base material layer 11 by a vapor deposition method, etc. The anode collector layer 13a is, for example, formed of copper and is integrally formed with the base material layer 11 by a vapor deposition method, etc. The electrolyte layer 15 is, for example, formed of a separator such as polyethylene or polypropylene and electrolytic solution.

Here, a unit cell layer, which is a minimum element for generating power, is formed of the cathode 12, the electrolyte layer 15 and the anode 13 arranged between a pair of base material layers 11. Since the cathode active material layer 12b, the anode active material layer 13b and the electrolyte layer 15 include generally known materials, detailed explanations thereof are omitted herein.

The collecting tab portion 20 extends from an end of the battery element 10 and the bonding tab 30 for extracting the electricity is bonded thereto. The collecting tab portion 20 is formed of a base material layer 11, a cathode collector layer 12a and an anode collector layer 13a extending from an end of the electrode structure 14. The collecting tab portion 20 of the present embodiment comprises a cathode collecting tab portion 20a and an anode collecting tab portion 20b, which extend from opposite ends of the electrode structure 14.

The bonding tab 30 is bonded to the collecting tab portion 20 and conducts electricity generated in the battery element 10. The bonding tab 30 comprises a cathode bonding tab 30a bonded to the cathode collecting tab portion 20a of the electrode structure 14 and an anode bonding tab 30b bonded to the anode collecting tab portion 20b. The cathode bonding tab 30a is, for example, formed of an aluminum plate, whereas the anode bonding tab 30b is, for example, formed of a copper plate.

The cathode bonding tab 30a is inserted between adjacent cathode collecting tab portions 20a of the electrode structure 14 and are bonded on their lower side to the cathode collector layer 12a of the cathode collecting tab portion 20a. The cathode bonding tab 30a can extend to the outside of the battery element 10. Likewise, the anode bonding tab 30b is inserted between adjacent anode collecting tab portions 20b of the electrode structure 14 and are bonded on their upper side to the anode collector layer 13a of the anode collecting tab portion 20b. The anode bonding tab 30b can extend to the outside of the battery element 10. Further, in the present embodiment an insulating layer 35 is formed between each cathode bonding tab 30a and the adjacent anode collector layer 13a to prevent the cathode bonding tab 30a from contacting the anode collector layer 13a, thereby preventing a short circuit. Likewise, an insulating layer 35 is formed between each anode bonding tab 30b and the adjacent cathode collector layer 12a to prevent the anode bonding tab 30a from contacting the cathode collector layer 12a, thereby preventing a short circuit. The insulating layers 35 are, for example, formed of an electrical insulating tape such as a Kapton tape or an insulating paper.

Further, the bonding tab 30 is closely spaced between the adjacent collecting tab portions 20 of the electrode structure 14. In other words, the bonding tab 30 is formed such that a total thickness of the bonding tab 30 and the insulating layer 35 is substantially equal to a total thickness of the cathode active material layer 12b, the electrolyte layer 15 and the anode active material layer 13b. This is to allow the space formed between the adjacent collecting tab portions 20 of the electrode structure 14 to be charged.

Figure 2:
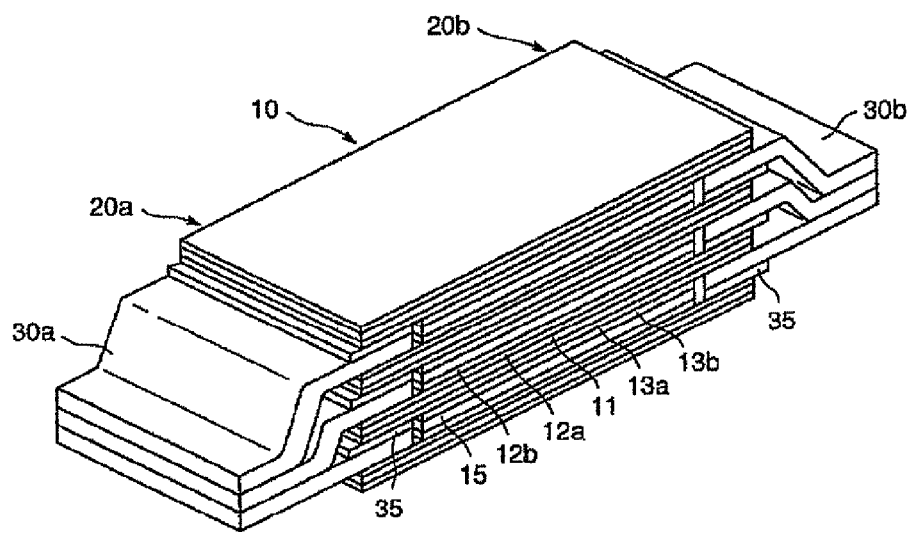
FIG. 2 is a perspective view of the secondary battery shown in FIG. 1.

Also, as shown in FIG. 2, a plurality of cathode bonding tabs 30a extending from the battery element 10 is overlapped at a side portion of the battery element 10 and then bonded to each other. Likewise, a plurality of anode bonding tabs 30b extending from the battery element 10 is overlapped at an opposite side portion of the battery element 10 and then bonded to each other. At the bonded cathode bonding tabs 30a and the bonded anode bonding tabs 30b, the cathode tab 40a and the anode tab 40b are respectively bonded to conduct electricity generated in the electrode element 10 externally of the exterior member 50. The collecting tab portion 20, the bonding tab 30 and the electrode tab 40 are bonded to each other by, for example, an ultrasonic welding operation so that the electrical resistance can be reduced.

The secondary battery 100 constructed as described above comprises an electrode structure 14 wherein the cathode 12 is formed at one side of a base material layer 11 comprised of a single electrical insulating layer, and an anode 13 is formed at another side of the base material layer 11. The secondary battery 100 is formed by stacking a plurality of electrode structures 14 with an electrolyte layer 15 interposed therebetween such that the cathode 12 and anode 13 of adjacent electrode structures 14 oppose each other. That is, the cathode 12 and anode 13 of adjacent electrode structures 14 are located on opposed surfaces of the electrolyte layer 15. Further, each cathode bonding tab 30a and anode bonding tab 30b are bonded so that collecting tab portions 20a and 20b are interposed between the cathode bonding tab 30a and the anode bonding tab 30b at opposite ends of the electrode structure 14 wherein the cathode collector layer 12a, the base material layer 11 and the anode collector layer 13a are integrally formed. Thus, since the electrode structure 14 is supported at both ends by two bonding tabs 30a and 30b, a flexure of the electrode structure 14 is reduced over known structures. As a result, since deterioration of the bonding portion of the bonding tab 30 and the collecting tab portion 20 due to vibration or impact is restrained, the durability of the secondary battery can be improved over known structures.

Figure 3:
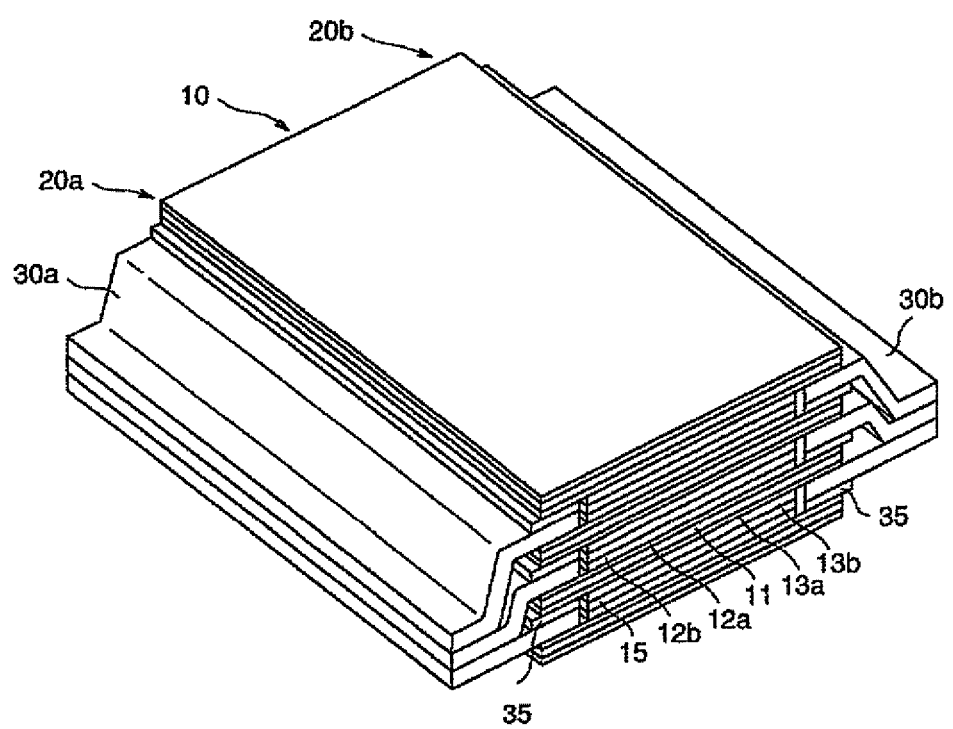
FIG. 3 is a perspective view of a modified secondary battery shown in FIG. 1.
Figure 5:
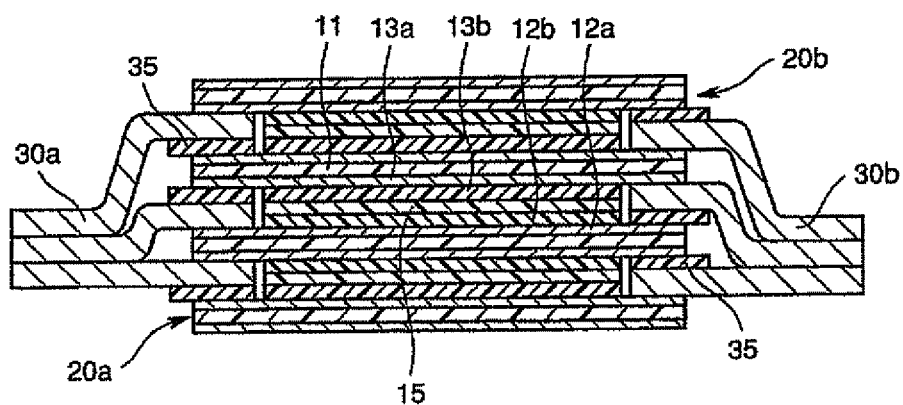
FIG. 5 is a cross-sectional view of a general secondary battery.

Further, the bonding tabs 30a and 30b extend out along a length direction of the rectangular-shaped battery element 10. However, as shown in FIG. 3, for example, the bonding tabs 30a and 30b may extend out from a side portion along the length direction of the rectangular shaped battery element 10 (i.e., the longer side). According to such configuration, the flexible volume of the electrode structure 14 can be significantly reduced as discussed hereinafter.

Next, referring to FIGS. 4A-4D and 5, the flexure of the secondary battery of the present embodiment is explained in detail.

FIGS. 4A and 4B show a method of calculating a schematic flexible volume of the secondary battery constructed in accordance with the first embodiment. Further, FIGS. 4C and 4D show a method of calculating a schematic flexible volume of the general secondary battery of FIG. 5.

As shown in FIGS. 4A and 4B, since both ends are supported by the cathode bonding tab 30a and the anode bonding tab 30a in the electrode structure of the secondary battery constructed in accordance with the present embodiment, a model is provided wherein a concentrated load or uniformly-distributed load is exerted to a bidirectional end support beam. Since only one end at one side is supported by the bonding tab in the electrode structure of the general secondary battery as shown in FIGS. 4C and 4D, a model is provided wherein a concentrated load or uniformly-distributed load is exerted to a cantilever beam. Here, from the mathematical formulas shown, it can be understood that the ratio of flexible volumes among the bidirectional end support beam wherein the concentrated load is exerted to a center portion, the cantilever beam wherein the concentrated load is exerted to a center portion, and the cantilever beam end wherein the concentrated load is exerted to a leading end is 1:5:16. Further, it can be understood that the ratio of flexible volumes between the bidirectional end beam wherein the uniformly-distributed load is exerted and the cantilever beam wherein the uniformly-distributed load is exerted is 1:9.6. Thus, since the electrode structure 14 is supported at both ends in the secondary battery 100 of the present embodiment, the flexible volume of the secondary battery 100 is reduced by about 1/10 to 1/5 compared to the flexible volume of the general secondary battery of FIG. 5.

The following effects can be obtained by the embodiment described above.

First, since the cathode bonding tab is mounted at one side of the electrode structure and the anode bonding tab is mounted at another side, it is possible to support the electrode structure at two differing points. As such, since the deterioration of the contact between the collecting tab portion and the bonding tab is restrained, it is possible to improve the durability of the secondary battery. Further, it is possible to restrain a distance between electrodes of the cathode and anode interposing the separator therebetween from widening due to the effect of vibrations, etc. As a result, the contact area between the bonding tabs and collecting tabs is preserved, thus it is possible to prevent increases in inner resistance.

Also, it is possible to manufacture the secondary battery by manufacturing one type of electrode structure (regardless of the cathode and anode) simultaneously with reducing the number of bonding tabs and bonding portions.

In addition, the base material is formed having at least one insulating layer. The cathode comprises the cathode collector layer and the cathode active material layer, which are sequentially stacked at one side of the base material. The anode comprises the anode collector layer and the anode active material layer, which are sequentially stacked at another side of the base material. Thus, it is possible to form the electrode structure with a minimum number of elements.

A cathode collecting tab portion and an anode collecting tab portion are formed wherein the cathode bonding tab is bonded to the cathode collecting tab portion and the anode bonding tab portion is bonded to the anode collecting tab portion. The cathode collecting tab portion is formed since the base material layer and the cathode collector layer extend from the end of the electrode structure. The anode collecting tab portion is formed since the base material layer and the anode collector layer extend from the end of the electrode structure. Thus, it is possible to easily conduct electricity generated in the battery element to the outside.

The cathode collecting tab portion and the anode collecting tab portion extend from opposite ends of the electrode structure. Thus, the flexure of the electrode structure can be minimized since it is possible to support the electrode structure at both ends.

Each cathode bonding tab is closely inserted between adjacent cathode collecting tab portions of the electrode structure and extends from between the adjacent cathode collecting tab portions to the outside. Each anode bonding tab is closely inserted between adjacent anode collecting tab portions of the electrode structure and extends from between the adjacent anode collective tab portions to the outside. Thus, since the bonding tab serves as a reinforcing member, the durability of the secondary battery is much more improved.

In the structure shown in FIG. 3, the cathode collecting tab portion and the anode collecting tab portion can extend from the side portion along the length direction of the rectangular-shaped electrode structure. As such, a distance formed between the opposite ends of the electrode structure becomes as short as possible. Thus, it is possible to significantly reduce the flexure of the electrode structure.

The base material layer has heat resistance such as the thermosetting resin described above. Thus, since the heat generated in the electrode structure can be emitted, the heat durability of the secondary battery is improved.

The base material layer has an extensibility property. Thus, since the short circuit of the cathode and anode is better prevented, the reliability of the secondary battery is improved.

In the first embodiment, the short circuit due to the contact of the bonding tab 30 with the cathode 12 or anode 13 is prevented by forming the insulating layer 35 between the collecting tab portion 20 and the bonding tab 30. In a second embodiment described next with respect to FIG. 6, the short circuit of the bonding tab with the cathode 12 or anode 13 is prevented without using the insulating layer 35.

Figure 6:
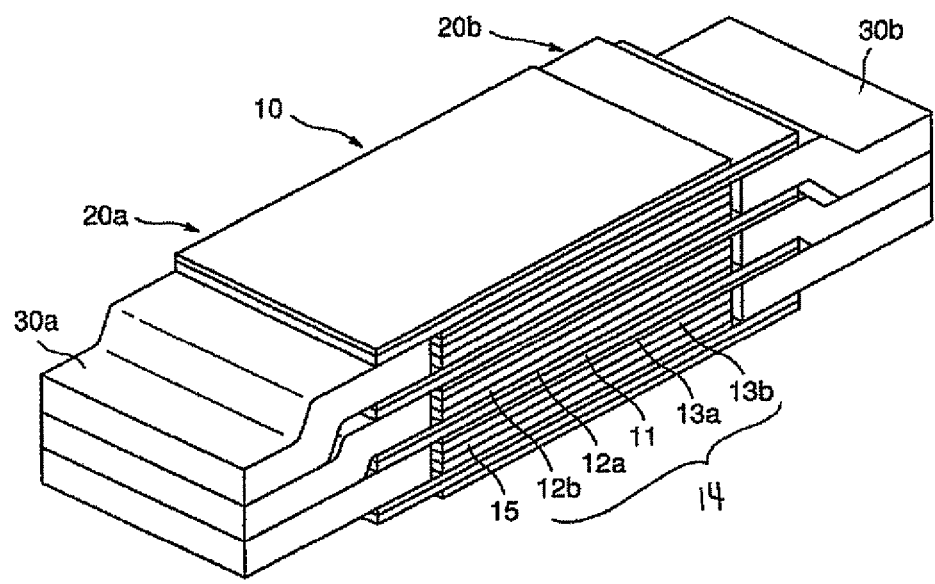
FIG. 6 is a perspective view of a secondary battery constructed in accordance with a second embodiment of the invention.

As shown in FIG. 6, the base material layer 11 is exposed at one side of the collecting tab portion 20. Further, with the exception of the base material layer 11 being exposed at one side of the collecting tab portion 20, the secondary battery constructed in accordance with the second embodiment is identical to that of the first embodiment so detailed explanations thereof are omitted herein. Also, to simplify explanations, the electrode tab and the exterior member are not shown.

The cathode collecting tab portion 20a of the second embodiment is formed wherein only the cathode collector layer 12a and the base material layer 11 extend from the end of the electrode structure 14. The base material layer 11 is exposed at an opposite side of the bonding portion on which the cathode bonding tab 30a is bonded. Likewise, the anode collecting tab portion 20b is formed wherein only the anode collector layer 13a and the base material layer 11 extend from the end of the electrode structure. The base material layer 11 is exposed at an opposite side of the bonding portion on which the anode bonding tab 30b is bonded.

Also, each cathode bonding tab 30a inserted between adjacent cathode collecting tab portions 20a is bonded to the cathode collector layer 12a of the cathode collecting tab portion 20a at a lower side while contacting the base material layer 11 of the cathode collecting tab portion 20a at an upper side. Likewise, each anode bonding tab 30b inserted between adjacent anode collecting tab portions 20b is bonded to the anode collector layer 13a of the anode collecting tab portion 20b at an upper side while contacting the base material layer 11 of the anode collecting tab portion 20b at a lower side. Accordingly, a short circuit by contact between the cathode bonding tab 30a and the anode 13 is prevented. Further, a short circuit by contact between the anode bonding tab 30*b* and the cathode 12 is prevented.

The bonding tab 30 of the second embodiment is closely fitted between adjacent collecting tab portions 20 of the electrode structure 14. In other words, the bonding tab 30 is formed such that a thickness of the bonding tab 30 is almost equal to a total thickness of the cathode active material layer 12*b*, the electrolyte layer 15 and the anode active material layer 13*b*. This allows a space formed between the adjacent collecting tabs 20 of the electrode structure 14 to be charged.

In addition to the effects of the first embodiment, a following additional effect can be obtained by the second embodiment described above.

Namely, since the base material layer is exposed at the side of the cathode collecting tab portion opposite to the cathode collector layer, the cathode bonding tab and the anode are electrically insulated. Further, since the base material layer is exposed at the side of the anode collecting tab portion opposite to the anode collector layer, the anode bonding tab and the cathode are electrically insulated. Thus, a short circuit produced by a contact between the cathode bonding tab 30*a* and the anode 13 is prevented. Also, a short circuit produced by a contact between the anode bonding tab 30*b* and the cathode 12 is prevented. Further, the insulating layer 35 formed between the collecting tab portion 20 and the bonding tab 30 can be omitted.

Figure 7:
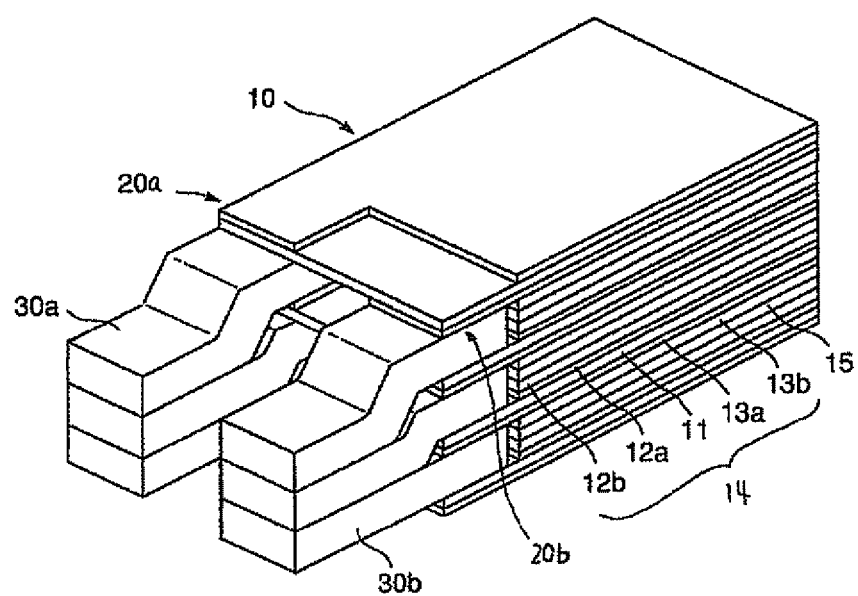
FIG. 7 is a perspective view of a secondary battery constructed in accordance with a third embodiment of the invention.

Referring now to FIG. 7, a third embodiment of the invention is explained. In this embodiment, the cathode tab and the anode tab are drawn out from the same end of the secondary battery.

As shown in FIG. 7, the cathode collecting tab portion 20*a* and the anode collecting tab portion 20*b* extend from one end of the electrode structure 14. Further, the cathode bonding tabs 30*a* and the anode bonding tabs 30*b* extend out to the same direction. With these exceptions, the secondary battery constructed in accordance with the third embodiment is the same as that of the first and second embodiments so detailed explanations thereof are omitted.

The collecting tab portion 20 of the third embodiment is formed such that the base material layer 11, the cathode collector layer 12*a* and the anode collector layer 13*a* extend from one end of the electrode structure 14. At the upper surface of the collecting tab portion 20, the cathode collector layer 12*a* partially extends to be bonded to the cathode bonding tab 30*a*, and the base material layer 11 is exposed at a remaining portion thereof. Further, at the lower surface of the collecting tab portion 20, the anode collector layer 13*a* partially extends to be bonded to the anode bonding tab 30*a*, and the base material layer 11 is exposed at a remaining portion thereof.

Accordingly, the electrode structure 14 is supported at two differing points of the same end by the cathode bonding tab 30*a* and the anode bonding tab 30*b*. As such, the same electrodes are formed at both surfaces of the insulating layer. Further, compared to a general secondary battery wherein the cathode tab and the anode tab are drawn out from the same end, the flexure of the electrode structure is reduced.

Figure 8:
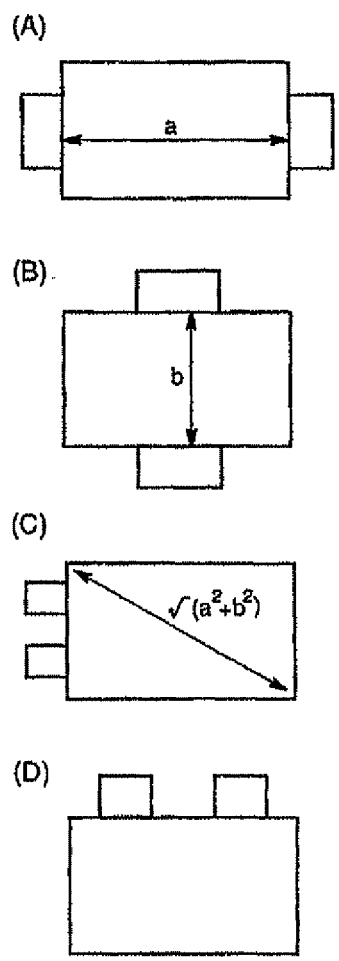
FIG. 8 shows a reducing effect of a flexible volume of the secondary batteries constructed in accordance with the first to third embodiments of the invention.

Referring to FIG. 8, a reducing effect of a flexible volume of the secondary batteries constructed in accordance with the first to third embodiments is explained.

Structure A shows an effect when the cathode and anode electrode tabs are drawn out from opposite ends along a width direction of the rectangular-shaped secondary battery. Structure B shows an effect when the cathode and anode electrode tabs are drawn out from opposite ends along the length direction of the rectangular-shaped secondary battery. Structure C shows an effect when the cathode and anode electrode tabs are drawn out from the same end along the width direction of the rectangular-shaped secondary battery. Structure D shows an effect when the cathode and anode electrode tabs are drawn out from the same end along the length direction of the rectangular-shaped secondary battery. Also, L indicated in FIG. 8 corresponds to L in each formula of FIGS. 4A-4D.

Compared to a general secondary battery (comparison example) wherein the electrode structure is supported in the cantilever beam shape, the flexure of the electrode structure is reduced in structures (A) and (B) since these electrode structures are supported at both ends. In particular, in the embodiment of structure B, the flexible volume is most reduced. Further, the embodiments shown in structures (C) and (D) are not different from the general secondary battery given that these electrode structures are supported in the cantilever beam shape. However, in embodiments of the secondary battery taught herein, since a length L of a beam that becomes a standard for calculating the flexible volume based on the mathematical formulas in FIGS. 4C and 4D is shorter than that in the general secondary battery, the effect of reducing the flexible volume is achieved. Effects shown in the table of FIG. 8 are indicated as ⊚>○>Δ in the order of greatest improvements to the lowest.

According to the third embodiment constructed as above, the following effect can be obtained in addition to the effects of the first and second embodiments.

Namely, since the electrode structure 14 can be supported at two different points of the same end due to the cathode collecting tab portion and the anode collecting tab portion extending from the same end of the electrode structure, the flexure of the electrode structure is reduced compared to the general secondary battery. As a result, the durability of the secondary battery is improved.

In the first to third embodiments, the cathode collecting tab portions 20*a* and the anode collecting tab portions 20*b* of the electrode structures 14 are bonded to different cathode bonding tabs 30*a* and the different anode bonding tabs 30*b*, respectively. In a fourth embodiment, the cathode collecting tab portions 20*a* and the anode collecting tab portions 20*b* of the electrode structures 14 are bonded to the same cathode bonding tab 30*a* and the same anode bonding tab 30*b*, respectively.

Figure 9:
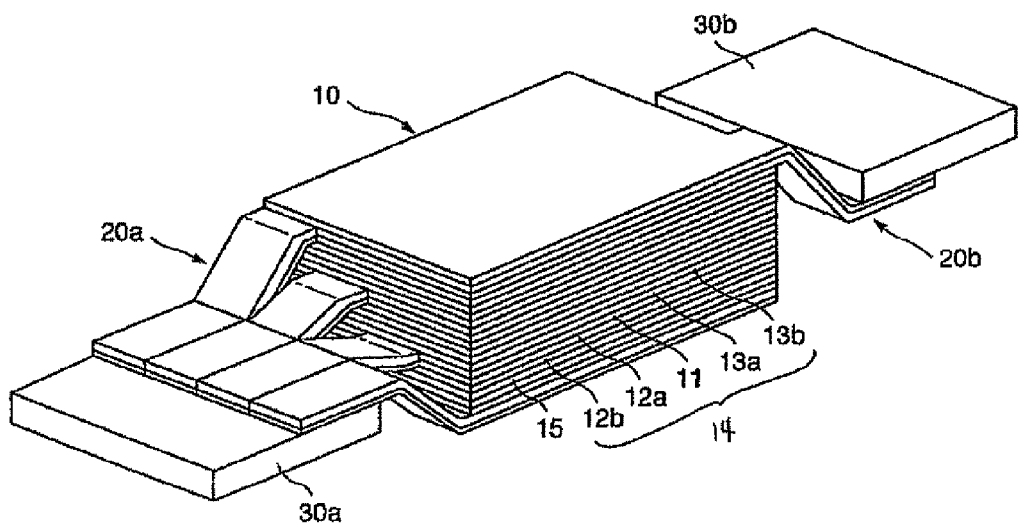
FIG. 9 is a perspective view of a secondary battery constructed in accordance with a fourth embodiment of the invention.

As shown in FIG. 9, in the secondary battery constructed according to the fourth embodiment, the cathode collecting tab portions 20*a* and the anode collecting tab portions 20*b* extend from differing positions in the electrode structures 14 so as not to overlap with each other.

More specifically, from the lower electrode structure 14 toward the upper electrode structure 14 of the battery element 10, each cathode collecting tab portion 20*a* extends from a position moved a predetermined distance along the end of the electrode structure 14. Likewise, from the lower electrode structure 14 toward the upper electrode structure 14 of the battery element 10, each anode collecting tab portion 20*b* extends from a position moved a predetermined distance along the end of the electrode structure 14.

Accordingly, since it is possible to bond the bonding tab portions 20*a* to one bonding tab 30*a*, it is possible to simplify the manufacturing process. Further, it is possible to reduce the number of bonding tabs, Also, since the electrode tab 40 is omitted in this embodiment the bonding tab 30 may extend directly to the outside of the exterior member 50.

According to the fourth embodiment constructed as above, the following effects can be obtained in addition to the effects of the first to third embodiments.

First, since it is possible to bond the collecting tab portions to one bonding tab, it is possible to simplify the manufacturing process.

Second, the cathode collecting tab portion and the anode collecting tab portion extend from different positions in each electrode structure. Thus, it is possible to bond the cathode collecting tab portion and the anode collecting tab portion to one cathode bonding tab and one anode bonding tab in different positions, respectively.

Figure 10:
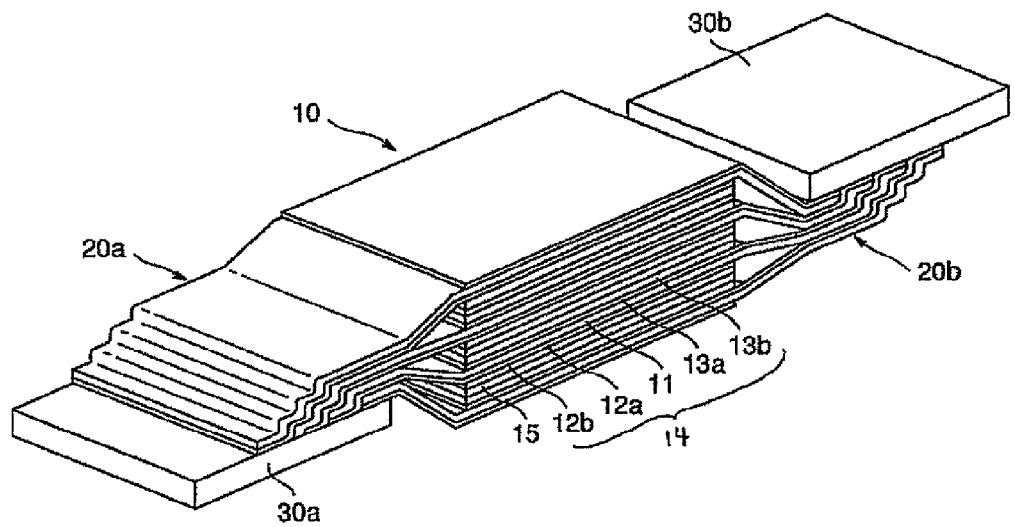
FIG. 10 is a perspective view of a secondary battery constructed in accordance with a fifth embodiment of the invention.

Referring now to FIG. 10, a fifth embodiment of the invention is explained below. In this embodiment, the collecting tab portions 20 extend to different lengths in each of the electrode structures 14 stacked upon one another. More specifically, from the lower electrode structure 14 toward the upper electrode structure 14 of the battery element 10, each cathode collecting tab portion 20a extends further than the last to become longer therefrom. Further, from the upper electrode structure 14 toward the lower electrode structure 14 of the battery element 10, each anode collecting tab portion 20b extends further from the last to become longer therefrom.

Accordingly, since it is possible to bond the collecting tab portions 20 to one bonding tab 30, it is possible to simplify the manufacturing process. Further, it is possible to reduce the number of bonding tabs. Also, since the electrode tab 40 is omitted in this embodiment, the bonding tab 30 may extend directly to the outside of the exterior member 50.

According to the fifth embodiment constructed as above, the following effect can be obtained in addition to the effects of the first to fourth embodiments.

The cathode collecting tab portion and the anode collecting tab portion extend to different lengths in each electrode structure. Thus, it is possible to bond the cathode collecting tab portion and the anode collecting tab portion with one cathode bonding tab and one anode bonding tab in different positions, respectively.

Figure 11:
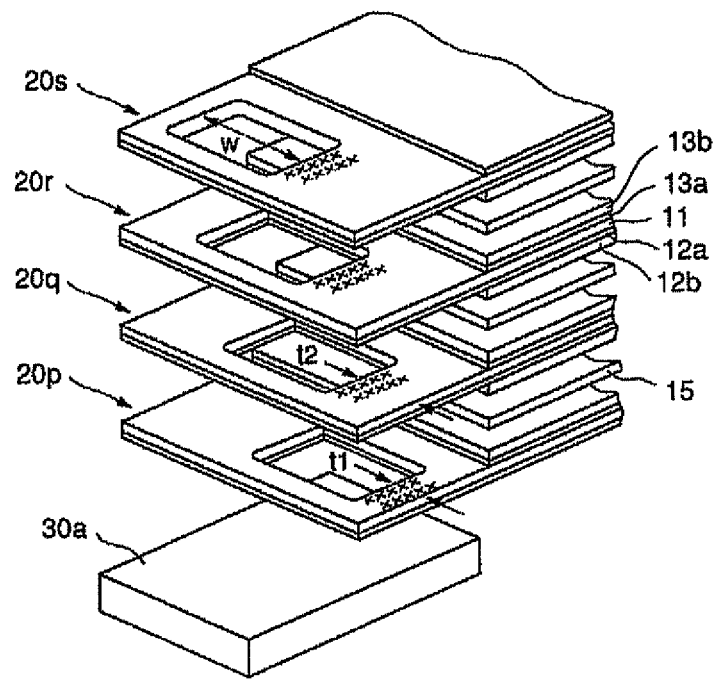
FIG. 11 is an exploded perspective view of a secondary battery constructed in accordance with a sixth embodiment of the invention.

In a sixth embodiment shown in FIG. 11, an aperture is provided in the collecting tab portion 20s so that the collecting tab portions 20 are bonded to one bonding tab 30.

More specifically, as shown in FIG. 11, the aperture is provided in the collecting tab portions 20 at different positions in each electrode structure 14. As shown, from the lower electrode structure 14 toward the upper electrode structure 14 of the battery element 10 in the secondary battery 100, each aperture is formed such that a distance from a side portion of the collecting tab portions 20 becomes larger. That is, if a bonding width by the ultrasonic welding operation is represented as T, a width of the aperture (punching width) is represented as W, and each distance between the opening and the side portion of the collecting tab portion 20 (i.e., bonding margin) is represented as t1, t2, t3, . . . , the aperture is formed such that T<t1<t2<t3 and T×stacking number <W.

A first collecting tab portion 20p in a lowermost position is bonded to the bonding tab 30a in a region between the aperture and an edge, preferably the side edge, of the bonding tab 30. Further, a second collecting tab portion 20q in a second position from the bottom is bonded via the aperture formed on the first collecting tab portion 20p to the bonding tab 30a. Likewise, a third collecting tab portion 20r in a third position from the bottom is bonded via the apertures formed on the first and second collecting tab portions 20p and 20q to the bonding tab 30a. Also, a fourth collecting tab portion 20s in an uppermost position is bonded via the apertures formed on the first to third collecting tab portions 20p, 20q and 20r to the bonding tab 30a.

Accordingly, since it is possible to bond the collecting tab portions 20 to the same bonding tab 30, it is possible to simplify the manufacturing process. Further, it is possible to reduce the number of bonding tabs. Also, since the electrode tab 40 is omitted in this embodiment, the bonding tab 30 may extend directly to the outside of the exterior member 50.

According to the sixth embodiment constructed as above, the following effect can be obtained in addition to the effects of the first to fifth embodiments.

The apertures are provided in the cathode collecting tab portion and the anode collecting tab portion at different positions in each electrode structure. Further, the cathode collecting tab portions and the anode collecting tab portions are bonded via the apertures to the cathode bonding tab and the anode bonding tab, respectively. Thus, it is possible to bond the cathode collecting tab portion and the anode collecting tab portion to one cathode bonding tab and one anode bonding tab at different positions.

Figure 12:
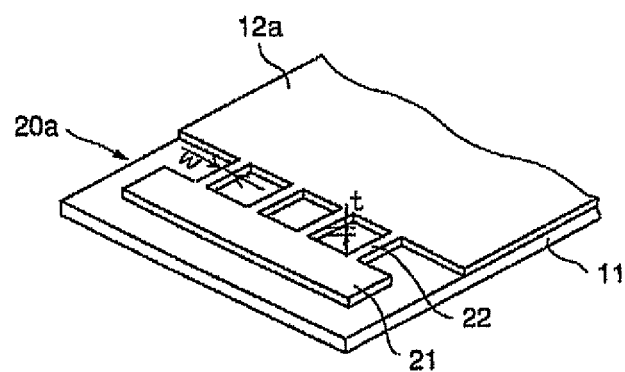
FIG. 12 is a perspective view of a secondary battery constructed in accordance with a seventh embodiment of the invention.

Referring now to FIG. 12, a seventh embodiment of the invention is explained. In this embodiment, the cathode collector layer and the anode collector layer of the collecting tab portion 20 are patterned.

More specifically, the collector layer of the collecting tab portion 20 comprises a portion 21 to be bonded and a plurality of current path portions 22 wherein the bonding tab 30 is bonded to the portion 21. The current path portions 22 connect the end of the electrode structure 14 and the portion 21. Such a patterned cathode collector layer or anode collector layer is formed by previously masking a desired region such that the base material layer 11 is exposed at the time of depositing a metal. The number of current path portions 22 is not limited to the configuration shown in FIG. 12.

For four current path portions 22 having a thickness "t" and a width "w," when a maximum current at the time of charging/discharging is I, since a current density is indicated as I/(t×w), the width "w" of the current path portion 22 is established such that a patterned portion is dissolved by a current increasing amount ΔI at the time of overcharging, etc., and a current circuit is cut off. Accordingly, it is possible to provide a fuse function to the collecting tab portion 20.

According to the seventh embodiment constructed as above, the following effect can be achieved further to the effects of the first to sixth embodiments.

Namely, the cathode collector layer or the anode collector layer is patterned such that the current density is partially increased in the cathode collecting tab portion and the anode collecting tab portion. Thus, since the collecting tab portion serves as a fuse, the reliability of the secondary battery is improved.

Figure 13:
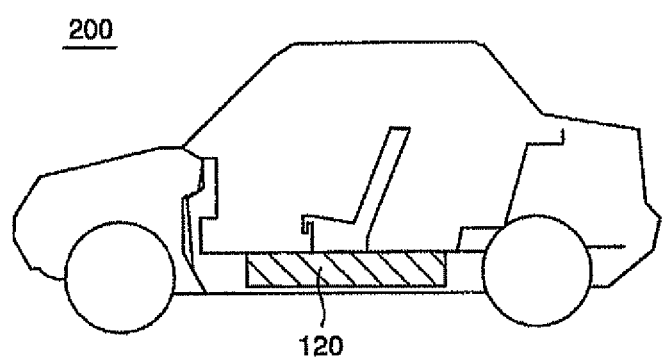
FIG. 13 shows a vehicle constructed in accordance with an eighth embodiment of the invention.

As shown in FIG. 13, the secondary battery 100 explained in the first to seventh embodiments is connected to one another in series or in parallel to form a battery module. Such a battery module is connected to one another in series or in parallel to form a battery assembly 120. The secondary battery 100, battery module and/or battery assembly 120 are mounted on a vehicle (e.g., automobile, electric train, etc.) to form an eighth embodiment and are used as a power source for driving electrical devices such as a motor.

In order to mount the battery assembly 120 on an electric vehicle 200, the battery assembly is mounted under a seat at a center portion of a vehicular body of the electric vehicle 200 as shown in FIG. 13. If the battery assembly 120 is mounted under the seat, then it is possible to maximize space in the vehicle interior and trunk. Further, a location at which the battery assembly 120 is mounted is not limited to under the seat but may include a lower portion of a rear side trunk compartment or an engine compartment in a vehicle front portion. The electric vehicle 200 using such a battery assembly 120 has high durability so that the electric vehicle 200 can provide sufficient power for long-term use. Also, it is possible to provide an electric vehicle and a plug-in/hybrid vehicle (PHEV) having superior fuel efficiency and traveling performance. Also, to use it as a power source for vehicles, it is preferred but not necessary that an inner resistance of the secondary battery ranges from about 1 to about 5 mΩ.

Further, embodiments of the invention may mount not only the battery assembly 120 but also only a battery module according to desired applications. A combination of the battery assembly 120 and the battery module may also be mounted.

In the electric vehicle of the eighth embodiment, the secondary batteries in accordance with the first to seventh embodiments are mounted as a power source for driving. Thus, since a secondary battery resistant to vibrations and having superior durability is used, it is possible to improve the reliability of the electric vehicle.

While the secondary battery and the vehicle mounting the same in accordance with the first to eighth embodiments of the invention are described above, the invention may include other embodiments, additions, modifications and omissions without deviating from the subject matter or scope of the invention.

For example, the second battery is formed to have a symmetrical structure comprising the cathode collecting tab portion and the anode collecting portion in the same configuration. However, the cathode collecting tab portion and the anode collecting portion may have different configurations. One example is whereby the cathode collecting tab portion extends from different positions in each electrode structure, and the anode collecting tab portion extends with different lengths in each electrode structure. In such a manner, it is possible to easily distinguish the cathode and the anode.

Further, the collecting tab portion in accordance with the fourth to seventh embodiments is not limited a configuration wherein the cathode bonding tab and the anode bonding tab are drawn out from different ends of the electrode structure. It may alternatively be used for the secondary battery in a configuration wherein each of the cathode bonding tab and the anode bonding tab is drawn out from the same end of the electrode structure.

The embodiments of the invention are explained more specifically in view of the following examples. However, the invention is certainly not limited to such examples.

In first to sixth examples, the secondary batteries in accordance with the first to sixth embodiments are manufactured. Further, a hammering test is performed for these secondary batteries.

As for a specific testing method, an acceleration sensor is mounted at a center portion of the secondary battery to thereby detect an outer force to the secondary battery by an impulse hammer. A vibration spectrum measured by the acceleration sensor is converted to a frequency and acceleration vibration amplitude by using a Fast-Fourier Transform (FFT) analyzer and the resulting frequency is averaged and smoothened. The improvement of the vibration damping rate against the standard (resulting from testing the general secondary battery shown in FIG. 5) is then calculated. Results of testing the first to sixth examples are indicated in Table 1 below.

In these examples, the following characteristics are in common:

Base material layer: Polyethylene terephthalate (PET) measuring 150 mm×100 mm×15 μm;

Cathode collector: Aluminum measuring 150 mm×100 mm×5 μm;

Anode collector: Copper measuring 150 mm×100 mm×5 μm;

Cathode active material: Manganese acid lithium measuring 150 mm×100 mm×100 μm;

Anode active material: Hard carbon measuring 150 mm×100 mm×100 μm;

Separator: Polypropylene measuring 150 mm×100 mm×20 μm; and

Number of stacked layers: 10 layers.

TABLE 1

|  | Improvement in vibration damping rate (%) |
| --- | --- |
| First embodiment | 90 |
| Second embodiment | 90 |
| Third embodiment | 33 |
| Fourth embodiment | 60 |
| Fifth embodiment | 70 |
| Sixth embodiment | 50 |

As indicated in Table 1, the improvement in the vibration damping rate is confirmed in all secondary batteries constructed in accordance with the first to sixth embodiments of the invention. In particular, in the secondary batteries in accordance with the first and second embodiments, highly superior effects are confirmed.

As discussed above, durability is improved according to the secondary battery of the invention.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A secondary battery comprising:
at least two stacked electrode structures, each electrode structure including a cathode active material layer formed on one surface of a cathode collector layer, an anode active material layer formed on one surface of an anode collector layer, and a base material layer having an electrical insulating property layered between the cathode collector layer and the anode collector layer;
an electrolyte layer interposed between adjacent electrode structures such that the cathode active material layer of one electrode structure is located on a surface of the electrolyte layer and the anode active material layer of another electrode structure is located on an opposed surface of the electrolyte layer;
at least two expansion portions formed from the base material layer, the cathode collector layer and the anode collector layer, wherein each of the at least two expansion portions has a cathode expansion portion and an opposing anode expansion portion;
at least one cathode collecting member for conducting electricity from the secondary battery, wherein one of the at least one cathode collecting member is layered directly between two adjacent cathode expansion portions such that the cathode collecting member is layered between the cathode collector layer of one adjacent cathode expansion portion and the anode collector layer of another adjacent cathode expansion portion, with an insulating layer interposed between the cathode collecting member and the anode collector layer; and
at least one anode collecting member for conducting electricity from the secondary battery, wherein one of the at least one anode collecting member is layered directly between two adjacent anode expansion portions such that the anode collecting member is layered between the anode collector layer of one adjacent anode expansion portion and the cathode collector layer of another adjacent anode expansion portion, with another insulating layer interposed between the cathode collecting member and the cathode collector layer.

2. The battery according to claim 1 wherein each cathode expansion portion and each cathode collecting member extend from a same side of the electrode structures, and each anode expansion portion and each anode collecting member extend from an opposite side of the electrode structures.

3. The battery according to claim 1 wherein each cathode expansion portion and each cathode collecting member and each anode expansion portion and each anode collecting member extend from a same side of the electrode structures.

4. The battery according to claim 1 wherein a portion of the base material layer of each cathode expansion portion is located between the associated cathode collector layer and an adjacent cathode collecting member to thereby electrically insulate the cathode collecting member bonded to the associated cathode collector layer from an adjacent anode; and
wherein the portion of the base material layer of each anode expansion portion is located between the associated anode collector layer and an adjacent anode collecting member to thereby electrically insulate an anode collecting member bonded to the associated anode collector layer from an adjacent cathode.

5. The battery according to claim 1 wherein each cathode expansion portion is bonded to a different position on the cathode collecting member, and each anode expansion portion is bonded to a different position on the anode collecting member.

6. The battery according to claim 5 wherein each cathode expansion portion extends from a different position along a first side of the electrode structures extending perpendicular to a stacked direction of the electrode structures, and each anode expansion portion extends from a different position along an opposing side of the electrode structures extending perpendicular to the stacked direction of the electrode structures.

7. The battery according to claim 5 wherein each cathode expansion portion extends to a different length from the electrode structures, and each anode expansion portion extends to a different length from the electrode structures.

8. The battery according to claim 5, wherein each cathode expansion portion includes a respective aperture through which the cathode expansion portion is bonded to the cathode collecting member, and each anode expansion portion includes a respective aperture through which the anode expansion portion is bonded to the anode collecting member.

9. The battery according to claim 1 wherein at least one side of the cathode collector layer or the anode collector layer of each respective cathode collecting member and anode collecting member is patterned such that a current density is partially increased.

10. The battery according to claim 1 wherein each base material layer has heat resistance.

11. The battery according to claim 1 wherein each base material layer has extensibility.

12. A vehicle including the battery according to claim 1.

13. A secondary battery comprising:
at least two stacked electrode structures, each electrode structure including a cathode active material layer formed on one surface of a cathode collector layer, an anode active material layer formed on one surface of an anode collector layer, and a base material layer having an electrical insulating property layered between the cathode collector layer and the anode collector layer;
an electrolyte layer interposed between adjacent electrode structures such that the cathode active material layer of one electrode structure is located on a surface of the electrolyte layer and the anode active material layer of another electrode structure is located on an opposed surface of the electrolyte layer;
at least two expansion portions each having a cathode expansion portion and an opposing anode expansion portion that extends beyond the electrolyte layer;
at least one cathode collecting member layered between the cathode collector layer of one adjacent cathode expansion portion and the anode collector layer of another adjacent cathode expansion portion, with an insulating layer interposed between the cathode collecting member and the anode collector layer; and
at least one anode collecting member layered between the anode collector layer of one adjacent anode expansion portion and the cathode collector layer of another adjacent anode expansion portion, with another insulating layer interposed between the cathode collecting member and the cathode collector layer,
wherein the electrode structures are formed of rectangular layers having opposing first ends extending along a width of the rectangular layers and opposing second ends extending along a length of the rectangular layers, wherein each cathode expansion portion and each anode expansion portion extends from one or both of the opposing second ends extending along the length.

14. The battery according to claim 1, wherein a total thickness of the cathode collecting member and the insulating layer is substantially equal to a total thickness of the cathode active material layer, the electrolyte layer and the anode active material layer, and a total thickness of the anode collecting member and the another insulating layer is substantially equal to a total thickness of the cathode active material layer, the electrolyte layer and the anode active material layer.

15. The battery according to claim 13, wherein a total thickness of the cathode collecting member and the insulating layer is substantially equal to a total thickness of the cathode active material layer, the electrolyte layer and the anode active material layer, and a total thickness of the anode collecting member and the another insulating layer is substantially equal to a total thickness of the cathode active material layer, the electrolyte layer and the anode active material layer.

* * * * *